United States Patent [19]
Cave

[11] 4,045,816
[45] Aug. 30, 1977

[54] AUTOMATIC CORRECTOR FOR FIXED PATTERN ODD/EVEN VIDEO NOISE

[75] Inventor: Ellis K. Cave, Garland, Tex.

[73] Assignee: Recognition Equipment Incorporated, Dallas, Tex.

[21] Appl. No.: 657,646

[22] Filed: Feb. 12, 1976

[51] Int. Cl.² .......................... H04N 3/12; H04N 3/14
[52] U.S. Cl. .................................... 358/212; 358/213;
340/146.3 MA; 250/578; 328/163
[58] Field of Search .............. 340/146.3 MA; 178/7.1,
178/7.2, DIG. 12; 358/212, 213, 285; 328/163;
307/221 D; 357/30; 250/518

[56] References Cited

U.S. PATENT DOCUMENTS

| | | | |
|---|---|---|---|
| 3,790,705 | 2/1974 | Kamin | 178/7.1 |
| 3,856,989 | 12/1974 | Weimer | 178/7.1 |
| 3,904,818 | 9/1975 | Kovac | 178/7.1 |
| 3,937,874 | 2/1976 | Carbone | 178/7.1 |
| 3,949,162 | 4/1976 | Malueg | 178/7.1 |

*Primary Examiner*—John C. Martin
*Assistant Examiner*—Aristotelis M. Psitos
*Attorney, Agent, or Firm*—John E. Vandigriff

[57] ABSTRACT

Fixed pattern odd/even noise in the video signal output from a self-scanned photosensor array is substantially eliminated by integrating the video signal at the cell scan rate, and converting the resultant to a pulse having a width proportional to the charge current generated by a photosensor cell. Even and odd pulses corresponding to alternate sensor cell video signals are produced, and the pulse widths are compared to form a correction signal. A current sink responsive to the correction signal adjusts the output of the integrator during even cell scans to eliminate fixed pattern odd/even noise in the output video signal.

In a specific embodiment, the fixed pattern odd/even noise correction system coacts with an AGC control system and a black reference control system to substantially eliminate fixed pattern odd/even noise and cell clock noise in the output video signal, and to provide an effective system immunity to variations in the parasitic capacitance of the photosensor array.

13 Claims, 9 Drawing Figures

AUTOMATIC CORRECTOR FOR FIXED PATTERN ODD/EVEN VIDEO NOISE

FIELD OF THE INVENTION

The present invention relates to video noise correcting systems, and more particularly to a system for eliminating clock signal noise in the output video signal of a self-scanned photosensor array.

DESCRIPTION OF THE PRIOR ART

In self-scanning photosensor arrays, each photosensor is addressed in sequence by array scanning logic and sampled to form a video signal. The array scanner may be driven by two complementary clocks, one of which goes high when the other goes low. On the negative transition of each clock signal, a video pulse is generated at the array video output. Each clock thereby causes generation of alternate pulses in a continuous video pulse stream.

A recurring problem in the use of such sensor arrays is the occurrence of clock signal noise in the output video signal. Such noise occurs when the clock signals driving the array scanning logic are coupled through the array to the video output terminal. While the effect upon cell responses may be slight at high light intensities, a video signal at low light intensities may be distorted significantly. For a sensor array that requires a two-phase clock, a common noise pattern is one in which an offset voltage level occurs in every other sampled cell. With an area array which has the fast scan direction along the $x$ or horizontal axis, such voltage offsets appear as a fixed pattern odd/even noise comprising vertical lines at every other column. In addition to the odd/even noise pattern, clock noise may appear as a pulse train superimposed upon the output video signal at the cell scan rate. Such noise is generally referred to as cell clock noise.

Noise correcting systems have employed a variety of partially successful methods to reduce the effects of clock signal noise in the output video signal. For example, a two channel amplifier has been used in which the odd and even array cells are processed by two separate circuits, and the gain or offsets of both channels are adjusted to produce a uniform output. Such a method is not effective, however, unless the input reference level of the odd and even pulses remains uniform.

Other noise correcting systems have attempted to eliminate clock signal noise at the source by adjusting the switching times of the two phases of a two-phase clock driving the array, and thereby synchronizing the leading edges of the clock signals. By attempting to compensate for noise at the source, however, variations in the array parasitic capacitance are not accommodated. Generally, the array parasitic capacitance necessary to produce a significant noise level in the output video signal is in the range of a fraction of a picofarad. Noise elimination through controlled manufacturing, therefore, is not practical when the sensor arrays are to be mass produced.

Prior noise correcting systems have been highly sensitive to hand movements in near proximity to a sensor array, to variations in ambient conditions and to the instability of system components. Such sensitivity is manifested by variations in the array parasitic capacitance, and a reduced signal-to-noise ratio. A consequence is a compromise in the reliability of any character decision process which utilizes the video output.

An automatic gain control (AGC) feedback loop has been added to the video processing chain to improve the signal-to-noise ratio, and to improve system immunity to component instabilities. In addition, an integrator has been added to the forward video processing channel to reduce cell clock noise. A later innovation has been the use of a black reference control loop to establish a stable black pattern reference for improved immunity to temperature variations, cell clock noise and component instability.

U.S. Published Pat. application No. B309,755, filed by Weimer, is directed to a method of increasing the signal-to-noise ratio of a video signal generated by a charge transfer image sensor array. The method involves combining a number of signals from adjacent elements of an array to form a single signal which is merely representative of the sum of the element signals. U.S. Pat. No. 3,629,499, issued to Carlson, describes an apparatus and method for reducing pattern noise in a vidicon-type camera tube having a thermal detector array for viewing infrared radiation.

None of the prior art hereinabove described discloses a dynamic noise correcting system which provides a video signal accurately representing an optical image presented to a photosensor array. Although the signal-to-noise ratio in the video processing chain is improved, noise sensitivity remains too acute for reliable recognition processing. The prior systems are particularly susceptible to variations in array parasitic capacitance.

The present invention provides a dynamic noise correcting system which efficiently accommodates variations in array parasitic capacitance, substantially eliminates fixed pattern odd/even noise in the output video signal of a photosensor array, and more effectively attenuates cell clock noise.

SUMMARY OF THE INVENTION

Fixed pattern odd/even noise offsets which may occur in an output video signal stream from a self-scanned photosensor array are dynamically corrected by integrating the output of each cell as it appears in the signal, producing from the integration voltages a pulse stream comprising a set of even pulses interlaced with a set of odd pulses, comparing the width of each even pulse in the pulse stream with the width of an adjacent odd pulse to produce a control voltage dependent upon the difference therebetween, and, in response to the control voltage, modifying the width of pulses in either the even or the odd set of pulses.

In a more specific aspect, each sensor cell response is integrated, and the integration voltage is sampled. The sample voltage is converted to a voltage ramp, which in turn is compared to a black character reference threshold to form a pulse having a width indicative of the grey level of the optical image presented to the array. Pulses corresponding to video signals generated by adjacent odd and even cells then are separated into odd and even pulse trains to drive a current sink and a current source, respectively. A capacitor is alternately charged by the current source and discharged by the current sink for time periods dependent upon the width of the driving pulse, thereby forming an offset correction voltage. In response to such correction voltage, a switchable current sink adjusts the amplitudes of integration voltages formed during even cell scan periods to substantially eliminate fixed pattern odd/even noises.

In one aspect of the invention, a dynamic odd/even noise control system coacts with an AGC control system and a black reference control system to substantially eliminate fixed pattern odd/even noise and cell clock noise in the output video signal of the array, and to effectively minimize system sensitivity to changes in the array parasitic capacitance.

DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF THE PREFERRED EMBODIMENT

FIG. 1

Figure 1:
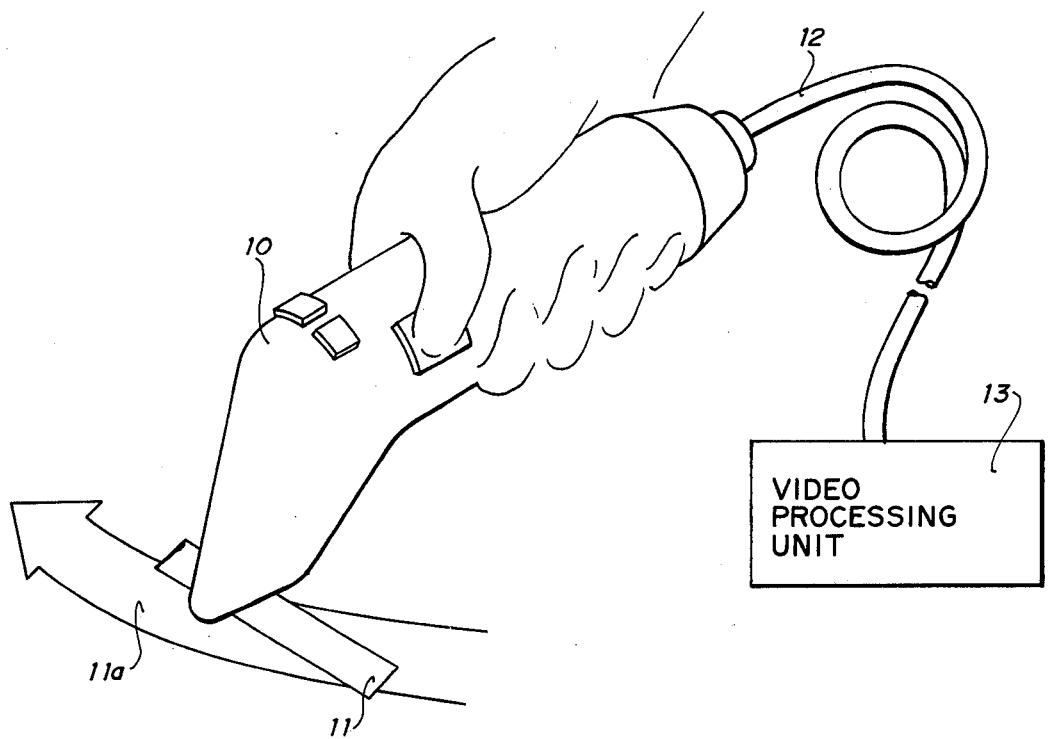
FIG. 1 is a perspective view of a handheld OCR Wand in electrical communication with a video processing unit.

In FIG. 1, a handheld wand 10 is provided for movement across a data field such as a tag 11 as indicated by path 11a. Wand 10 is a hand operated optical data acquisition and processing system having an aperture extending the width of a numeral or character to be read, and having several times the normal height of such characters. Optical means mounted in the wand direct light through the aperture onto a data field to be viewed. The character image appearing in the aperture is focused by a lens onto an array of photosensor elements such as photodiodes. The wand 10 is connected by way of cable 12 to a video processing unit 13 which enhances and digitizes video images of the alphanumeric data on tag 11.

FIG. 2

Figure 2:
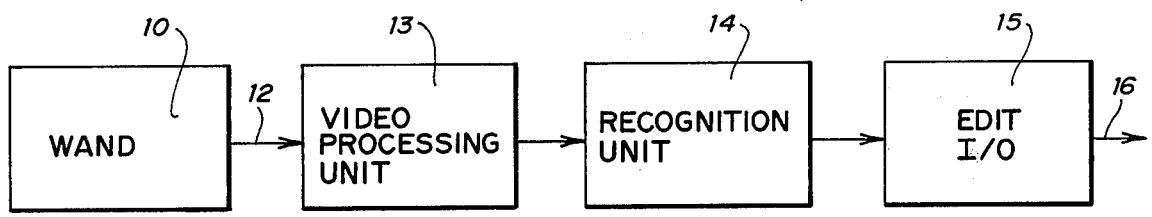
FIG. 2 is a functional block diagram of an OCR Wand system.

FIG. 2 is a functional block diagram of an optical character recognition (OCR) system for a handheld wand.

Information may be printed on a carrier such as a document, a merchandising tag, or other suitable means upon which information may be printed. The wand 10 illuminates the information printed on the carrier, and focuses the image onto an array of photosensor elements. The optical image then is electro-optically converted into an electrical analog of the visual image.

The video processing unit 13 accepts a video signal from the wand, and digitizes the signal for further processing. A recognition unit 14 operates upon the digital video images to identify characters comprising the information field viewed. The character decisions are supplied as a stream of characters from unit 14 to an edit unit 15, which edits the character stream according to a user's requirements. An edited alphanumeric data signal then is forwarded by way of a data channel 16 to succeeding information processing units.

The present invention is directed to improvements to the video processing unit 13.

FIG. 3

Figure 3:
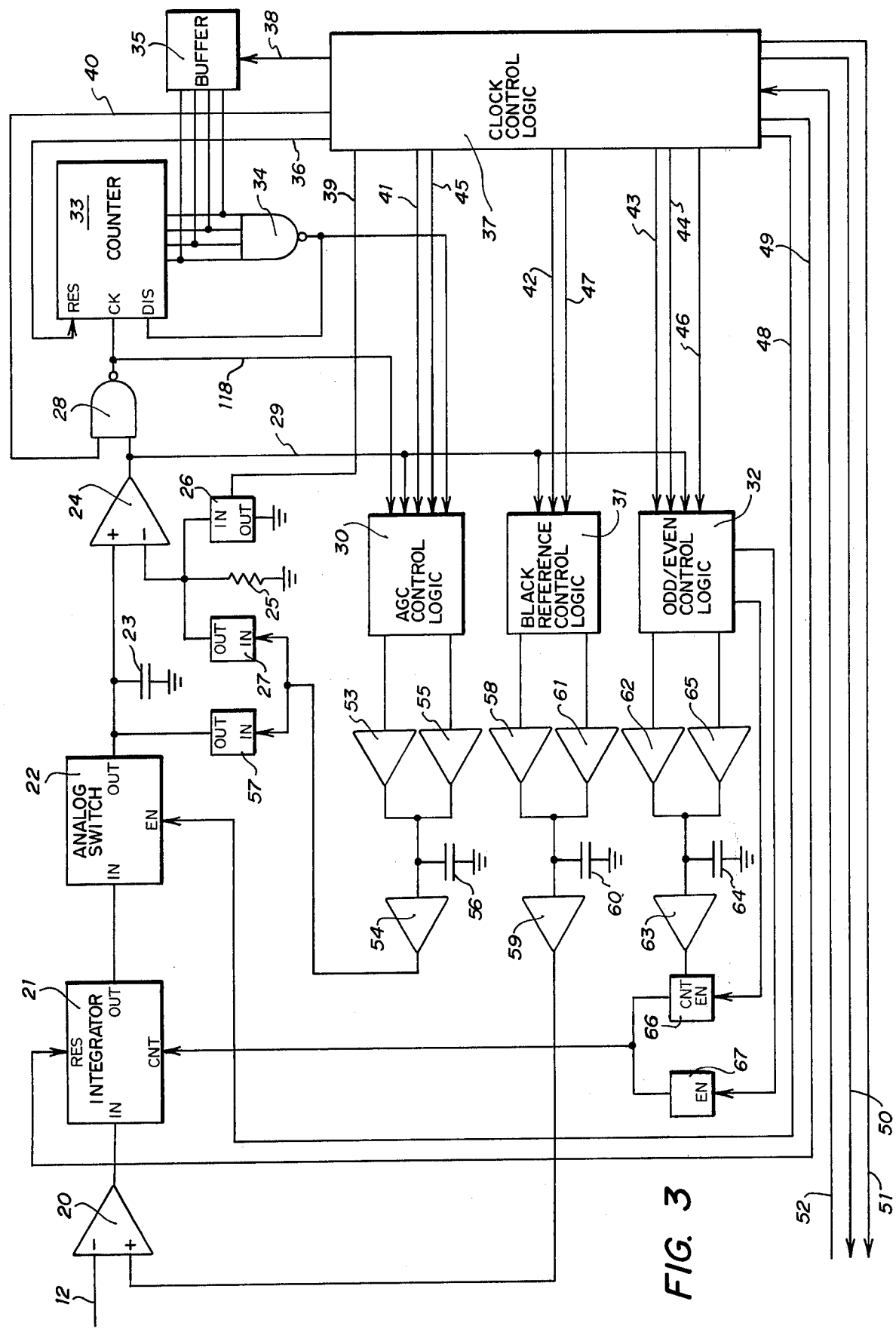
FIG. 3 is a functional block diagram of a dynamic noise correction system in accordance with the invention.

FIG. 3 is a functional block diagram of a dynamic noise correction system embodied in the video processing unit 13.

Video data from wand 10 is received by way of cable 12 at the negative input of a differential amplifier 20. The output of the differential amplifier is connected to the data input of an integrator 21.

The output of integrator 21 is applied to the data input of an analog switch 22 which samples the integrator near the end of an integration or sensor cell scan period. The output of switch 22 in turn is connected to one terminal of a 220 picofarad capacitor 23 having a second terminal connected to ground, and to the positive input of a comparator 24.

The negative input of comparator 24 is connected through a 330 ohm resistor 25 to ground, and to the outputs of an analog switch 26 and a voltage controlled current source 27. The output of comparator 24 is applied to an input of a NAND gate 28. The comparator 24 output also is applied along a data line 29 to an input of an automatic gain control (AGC) logic unit 30, to an input of a black reference control logic unit 31, and to an input of an odd/even control logic unit 32.

Comparator 24 may be of a type manufactured and sold by Signetics of Sunnyvale, Calif., and represented to the public as Type 527K.

The output of NAND gate 28 is connected to the clock (CK) input of a four bit counter 33 and to a second input of logic unit 30. The four output ports of counter 33 are connected to corresponding inputs of a NAND gate 34, and to corresponding inputs of a four bit buffer 35. The reset (RES) input to counter 33 is connected by way of a control line 36 to one output of a clock control logic unit 37, and the disable input (DIS) to the counter is connected to the output of NAND gate 34. The output of NAND gate 34 also is connected to a third input to logic unit 30.

Logic unit 37 supplies a load signal along a control line 38 to buffer 35 at the end of a cell scan period for the further processing of the video data, and issues an enable signal on a control line 39 leading to switch 26 during the time period that the black reference voltage is being updated. Logic unit 37 further supplies a 36 MHz clock signal to a control line 40 leading to a second input of NAND gate 28. Logic unit 37 in addition provides 1.8 MHz clock signals on control lines 41, 42, 43 and 44 leading to a fourth input of logic unit 30, a second input of logic unit 31, and to second and third inputs of logic unit 32, respectively. Logic unit 37 also provides clock signals at the array now scan rate on control lines 45 and 46 leading to a fifth input of logic unit 30 and a fourth input of logic unit 32, respectively. A burst of clock signals repeating at the photosensor array frame rate is supplied to a control line 47 leading to a third input of logic unit 31. In addition, a reset pulse is issued to a control line 49 at the end of a cell scan period to reset integrator 21, and an enable pulse is issued near the end of a cell scan period to a control line 48 leading to the enable (EN) input of analog switch 22.

The logic unit 37 also controls the scanning of the sensor array of wand 10. A row clock signal is supplied to the array scanner by way of a control line 50, and a cell clock signal is supplied by way of a control line 51. At the end of a frame scan period, the sensor array of wand 10 issues a pulse which is applied along a control line 52 to an input of logic unit 37. The operation of unit 37 thereby is synchronized with the scanning of the sensor array.

A first output of logic unit 30 is connected through a switchable current source 53 to an input of a buffer amplifier 54. A second output of logic unit 30 is applied through a switchable current sink 55 to the input of amplifier 54, and to a first terminal of a 0.33 microfarad capacitor 56 having a second terminal connected to ground. The output of amplifier 54 is applied as a negative control voltage to a voltage controlled current sink 57 and to current source 27. The output of current sink 57 is connected to the positive input of comparator 24.

Logic unit 30, current source 53, current sink 55, capacitor 56, amplifier 54 and current sink 57 comprise an AGC control system controlling the discharge rate of capacitor 23. Current source 27, resistor 25 and switch 26 act in combination with the AGC control system to compress the operational range of an analog to digital (A/D) convertor comprised of comparator 24, gate 28, counter 33 and gate 34.

A first output of logic unit 31 is applied through a switchable current source 58 to the input of a buffer amplifier 59, and to one terminal of a 0.33 microfarad capacitor 60 having a second terminal connected to ground. A second output of logic unit 31 is applied through a switchable current sink 61 to the input of amplifier 59, the output of which is connected to the positive input of amplifier 20. Logic unit 31, current source 58, current sink 61, capacitor 60 and amplifier 59 comprise a black reference control system which eliminates DC offsets received from the photosensor array during a black row rescan, and thereby stabilizes the video data signal with respect to ground.

A first output of logic unit 32 is connected through a switchable current source 62 to the input of a buffer amplifier 63, and to one terminal of a 0.33 microfarad capacitor 64 having a second terminal connected to ground. A second output of logic unit 32 is connected through a switchable current sink 65 to the input of amplifier 63. A third output of unit 32 is connected to the enable input of a switchable current sink 66, the voltage control input of which is connected to the output of amplifier 63. A fourth output of logic unit 32 is connected to the enable input of a constant current sink 67. The outputs of current sink 67 and current sink 66 are each connected to the control input (CNT) of integrator 21.

The circuit loop including logic unit 32, current source 62, current sink 65, capacitor 64, buffer 63, current sink 66 and current sink 67 comprise a control system for eliminating fixed pattern pattern odd/even noise. Thus, character patterns that are moving across the array will have the same average affect on the odd cells as on the even cells. The response of the system is slow compared to the cell scan rate to prevent character image patterns from adversely affecting the offset correction process.

In operation, video data from wand 10 is received by way of cable 12 at the input of differential amplifier 20. The output of the amplifier is fed to integrator 21 which is reset by logic unit 37 immediately before each photocell of the sensor array is scanned. Prior to the integrator being reset, the peak voltage at the output of the integrator is sampled near the end of a cell scan period by switch 22 under the control of an enable signal on line 48. The sampled voltage then is transferred by switch 22 to capacitor 23, which is charged to a voltage level representative of the final scan period integration voltage.

Upon a next photocell being scanned, logic unit 37 first disables switch 22, and then resets integrator 21 by means of control pulses applied to lines 48 and 49, respectively. When analog switch 22 is disabled, capacitor 23 is free to discharge at a rate controlled by the current sink 57.

The voltage ramp caused by the discharge of capacitor 23 is applied to the positive input of comparator 24. The initial height of the ramp is dependent on the sampled integrator output voltage, and the slope of the ramp is controlled by the AGC control system through current sink 57 to set the maximum white background level to be recognized.

Comparator 24 compares the voltage ramp with the reference voltage across resistor 25, and produces a logic one output as long as the voltage ramp is of a magnitude greater than that of the reference voltage. A logic zero is produced when the ramp voltage is less than the reference voltage.

The pulse width modulated output of comparator 24 is applied to NAND gate 28, the AGC control logic, the odd/even control logic, and the black reference control logic. If the output of comparator 24 is in a logic one state, NAND gate 28 is enabled and the 36 MHz signal on line 40 is applied to the clock input of counter 33. The output of NAND gate 28 consists of a group of gated 36 MHz clock pulses. The number of 36 MHz pulses in each group is proportional to the charge of the particular photodiode cell scanned. The width of the pulse at the output of comparator 24, and thus the magnitude of the count, are a function both of the magnitude and the discharge slope of the voltage across capacitor 23.

Since the counter is a four bit binary counter, it can count to a maximum of binary 1111 or decimal 15. Depending upon the whiteness of the media viewed, however, more than fifteen 36 MHz clock pulses may be counted. To prevent a counter roll over when a signal introducing a white level greater than the maximum white recognized (binary 1111) is received, NAND gate 34 is enabled by a count of 15 to disable counter 33.

During the scanning of a row of sensor cells comprising the sensor array, logic unit 30 senses the output of gates 28 and 34, and generates the AGC correction signals to be applied to current source 53 and current sink 55. The AGC control system acts at the row scan rate to force counter 33 to identify a white background as a binary fifteen, thereby dividing a video signal into 16 grey levels ranging from black (0) to white (15). For AGC control purposes, logic unit 30 senses the outputs of gates 28 and 34 to detect a count greater than 15, hereafter referred to as a sixteen count. If less than four of the sixteen counts are detected in the scanning of a row of sensor cells, logic unit 30 generates a correction signal at the end of the row scan to raise the voltage level of capacitor 56 by way of current source 53. When the voltage across capacitor 56 increases, the DC output of amplifier 54 is increased and the discharge current of current sink 57 is decreased. Thereafter, the system gain is increased and a lower voltage across capacitor 23 is required to produce a fifteen count wide pulse at the output of comparator 24. The current sink 57 in effect changes the scale factor for a multiplying A/D conversion.

If more than ten of the 16 counts are detected in logic unit 30 during a row scan, logic unit 30 generates a correction signal by way of current sink 55. The voltage across capacitor 56 is driven to a more negative level, the voltage output of amplifier 54 is decreased and the discharge current of current sink 57 is increased. Thereafter, a larger voltage across capacitor 23 is required to produce a 15 count video pulse at the output of comparator 24.

In the preferred embodiment herein disclosed, the video signal is generated by a self-scanned photosensor array having 38 rows of photosensors cells, with fourteen cells per row. Two cells per row are inactive to provide a row to row transition period equivalent to two cell scan periods. The limits of 10 and four relative to the detection of 15 counts were chosen for the efficient operation of the particular system used, and may change from system to system developed in accordance with the invention. No correction signals are generated by logic unit 30 when less than 11 but more than three 16 counts are detected in a row scan.

When an information pattern is being scanned, it has been found that printer ink reflectants cause a character black response which tends to be somewhat higher than absolute black. Further, the print contrast ratio is degraded by light impinging directly upon a photosensor array. During the processing of a video signal, these effects combine to limit the usable range of the ramp voltage applied to comparator 24. To compensate, switch 26 is disabled by logic unit 37 during the scanning of the sensor array for video responses. Current source 27 under the control of amplifier 54 then provides a voltage drop across resistor 25 which is equivalent to that which a black character would cause to occur across capacitor 23. The effect of the voltage drop across resistor 25 is to raise the zero video level from absolute black to a level approximately equivalent to 20% of the white background level. The operational range of the A/D converter comprising comparator 24, gate 28, counter 33 and gate 34 is compressed thereby, and the remaining video range is divided into the 16 grey levels (0–15) which are unaffected by ink reflectants or directly impinging light.

Thus, in response to the negative control voltage of amplifier 54, the current sink 57 and the current source 27 control the discharge rate of capacitor 23 and the reference voltage level across resistor 25, respectively. The white background of the information field is tracked thereby, and the video range compressed between character black and paper white for a more accurate optical data capture.

At the end of a cell scan period, the contents of counter 33 are strobed into four bit buffer 35, and counter 33 is reset by logic unit 37. Buffer 35 thereby provides a stable data source that changes only as it is updated at the end of each cell scan period. The buffer 35 content is indicative of a shade of grey, which is processed by a correlator (not shown) to resolve each sensor cell video signal to a black or white decision.

All light integrating imaging systems (LIS) produce electrical signals when light falls on a specially treated light sensitive area for a specified length of time. The charge remaining in the area after exposure to light is proportional to the integral of the amount of light falling on the area, hence the name "light integrating". The magnitude of each video recharging pulse decreases for the same light intensity as the total speed of scanning increases.

When the last row of a frame of sensor cells has been scanned, a frame synchronization pulse occurs on line 52 which is detected by logic unit 37. Logic unit 37 thereupon generates signals along lines 50 and 51 to force an immediate rescanning of the bottom row of the frame. The second scan, because of the short discharge time allowed, produces a signal that is essentially the same as if that row were completely blocked off from the exposure to light.

The black reference control system determines the offset necessary to provide a DC zero reference during a black row rescan. More particularly, in response to the frame synchronization pulse on line 52, logic unit 37 enables logic unit 31 and switch 26. The output of current source 27 thereby is shorted through switch 26 to ground, and the negative input to comparator 24 is held at ground potential. During the black row rescans, unit 31 senses the output of comparator 24, and tracks the DC shifts in the video signal which may be caused by sensor cell current leakage and DC offsets induced by DC amplifiers in the video processing chain. If a logic zero pulse is detected at the output of comparator 24 during a cell scan period, logic unit 31 enables current sink 61 to decrement the charge in capacitor 60. If the output of comparator 24 remains in a logic one state, logic unit 31 enables current source 58 to increment the charge in capacitor 60.

The black reference control system thus charges and discharges capacitor 60 as each cell of the bottom row of the sensor array is rescanned to balance DC offsets in the video signal. After a DC null is achieved at the output of amplifier 20, the output of integrator 21 remains near a zero level during a black row rescan. The voltage level across capacitor 60 thereupon becomes the absolute black reference for the next full frame scan period. At the end of the next frame scan, the DC reference is updated and the system black reference is corrected to compensate for any DC shifts that may have occurred during the frame scan.

The odd/even control system provides an amplitude correction for fixed pattern odd/even noise which may occur in the output video signal of a photosensor array. As before described, the width of a pulse at the output of comparator 24 corresponds to the amplitude of a signal peak received from integrator 21. Logic unit 32 under the control of logic unit 37 senses the output of comparator 24, and applies the even cell pulses to current source 62 and the odd cell pulses to current sink 65. Assuming that the signal peaks are higher for even cells than for odd cells, the pulses generated by comparator 24 are wider for the even numbered cells. Thus, the capacitor 64 is charged by current source 62 for a longer period than it is discharged by current sink 65. The net charge of capacitor 64, therefore, is increased as is the DC control voltage at the output of amplifier 63.

Current sinks 66 and 67 are alternately enabled by logic unit 32. Constant current sink 67 is enabled only during odd cell scans, and switchable current sink 66 is enabled only during even cell scans. Thus, a means exists for varying the negative integrator current produced jointly by sinks 66 and 67 during the alternate cell scans, thereby shifting the output voltage of the integrator 21. As the negative control current at the output of sink 66 increases, the output voltage of integrator 21 decreases during even cell scans until the comparator 24 pulse widths for both the even and odd cells are equal.

In the event that the signal peaks from integrator 21 are higher for odd than for even cells, the current sink 65 is enabled for a longer period than the current source 62. As a result, the capacitor 64 charge is decreased, and the integrator output voltage for even cells is increased. Thus, the voltage across capacitor 64 is corrected to a level required to eliminate the odd/even cell differences. When no odd/even cell differences are detected, the capacitor 64 charge remains unchanged.

In summary, the system of FIG. 3 accepts the video signal from the wand 10 at amplifier 20. A black reference offset, which is updated at the frame rate, is applied at amplifier 20 to eliminate DC offsets caused by sensor imperfections and amplifier drift in the video processing chain. The video signal then is integrated by integrator 21, the output of which is adjusted at the cell rate by the odd/even control loop to eliminate fixed pattern odd/even noise. Prior to the conversion of the analog video signal is to a digital format, the AGC control loop, which is updated at the row rate, controls the voltage level across resistor 25 to limit the operational range of the A/D conversion, and controls the discharge rate of the capacitor 23 to set the maximum white background level to be recognized. Each video pulse from the comparator 24 then is converted into a four bit digital word having a value proportional to the charging current of the photodiode being sampled.

In accordance with the invention, the odd/even control loop operates at the cell scan rate to eliminate fixed pattern odd/even noise in the video signal. Further, the odd/even control loop operates in concert with the black reference control loop and the AGC control loop to suppress cell clock noise, and to mitigate system sensitivity to variations in array coupling capacitance more effectively than can be provided by prior systems.

Figure 4A:
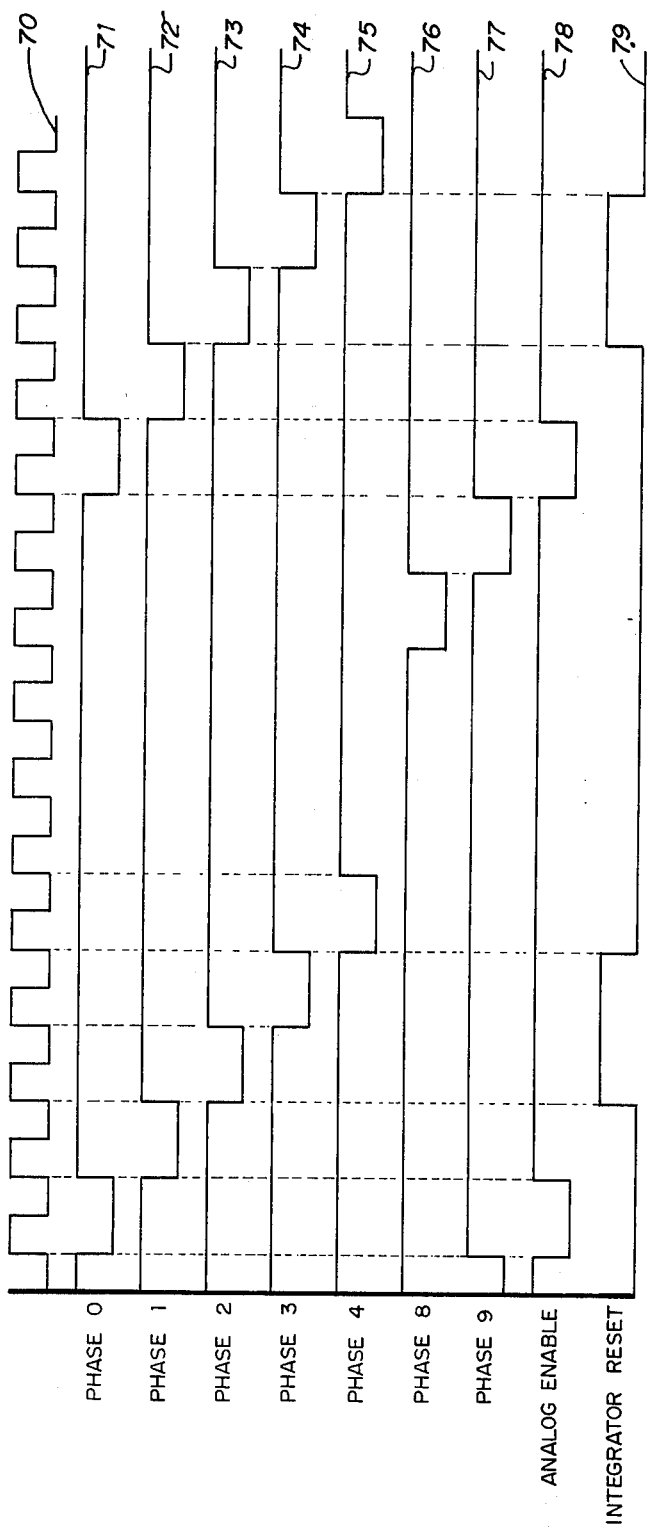
FIGS. 4a and 4b are timing diagrams illustrating the operation of the system of FIG. 3.
Figure 4B:
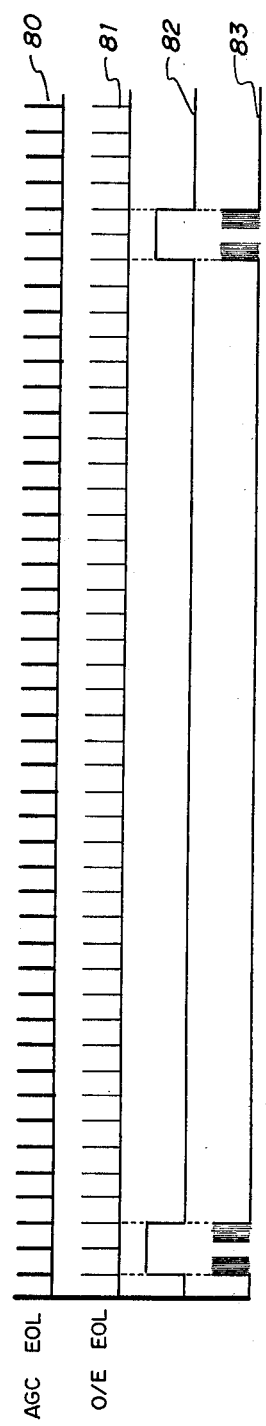

FIGURES 4a and 4b

The clock control logic unit 37 is not illustrated in detail as it is of conventional design well known in the art. FIGS. 4a and 4b, however, are timing diagrams illustrating the operation of logic unit 37.

Waveform 70 illustrates an 18 MHz clock signal derived from the 36 MHz system clock supplied to NAND gate 28 on line 40 of FIG. 3. Ten 1.8 MHz clock signals are derived from the 18 MHz clock signal illustrated by waveform 70. Waveforms 71, 72, 73, 74, 75, 76 and 77 illustrate the inverted phase 0, phase 1, phase 2, phase 3, phase 4, phase 8 and phase 9 clock signals which may be generated by a 4 to 10 decoder driven by a four bit divide-by-ten counter operating at a 1.8 MHz rate. Each of the waveforms has a frequency of 1.8 MHz and is comprised of pulses having a pulse width of 55 nanoseconds.

Waveform 78 illustrates the pulse train applied logic unit 37 along line 48 to control the duty cycle of analog switch 22. As may be seen by inspection of FIG. 4a, waveform 78 is in phase with waveform 71.

Waveform 79 illustrates the integrator reset pulse train issued by logic unit 37 along line 49 to integrator 21. The leading edge of each pulse of waveform 79 occurs at the leading edge of a pulse of waveform 73, and the trailing edge of each pulse of waveform 79 occurs at the leading edge of a pulse of waveform 75. Waveform 79 has a 1.8 MHz frequency, and is comprised of pulses having a pulse width of 110 nanoseconds.

Waveforms 80 and 81 of FIG. 4b illustrate pulses which occur only during the last cell scan period of a row scan, and which are applied to logic units 30 and 32, respectively. The leading edges of the pulses comprising waveform 80 occur in coincidence with the leading edge of every fourteenth pulse of waveform 71. The pulse width of the waveform 80 pulses is equal to one cell scan period. The leading edges of pulses comprising waveform 81, however, occur in coincidence with the leading edge of every fourteenth pulse of waveform 74. The trailing edges of such pulses occur in coincidence with the leading edge of every fourteenth pulse of waveform 76.

Waveform 80 is drawn to a different scale in FIG. 4b. Waveform 82 illustrates the enable pulse train which is supplied by logic unit 37 along line 39 to switch 26 of FIG. 3, and waveform 83 illustrates the pulse train applied along line 47 to logic unit 31 during the black row rescan period. Waveform 82 has a frequency equal to the frame scan rate, and is comprised of pulses having pulse widths of 15 microseconds. Waveform 83 is comprised of pulse groups which occur in phase with waveform 82. Each pulse group includes two sets of twelve pulses, each pulse having a width of 550 nanoseconds. As may be seen by inspection of FIG. 4b, each pulse of waveform 82 and each pulse group of waveform 83 has a leading edge which occurs at the end of a frame scan of the 38 row sensor array. The pulses width of each such pulse or pulse group is equivalent to two row scan periods.

FIGURE 5

Figure 5:
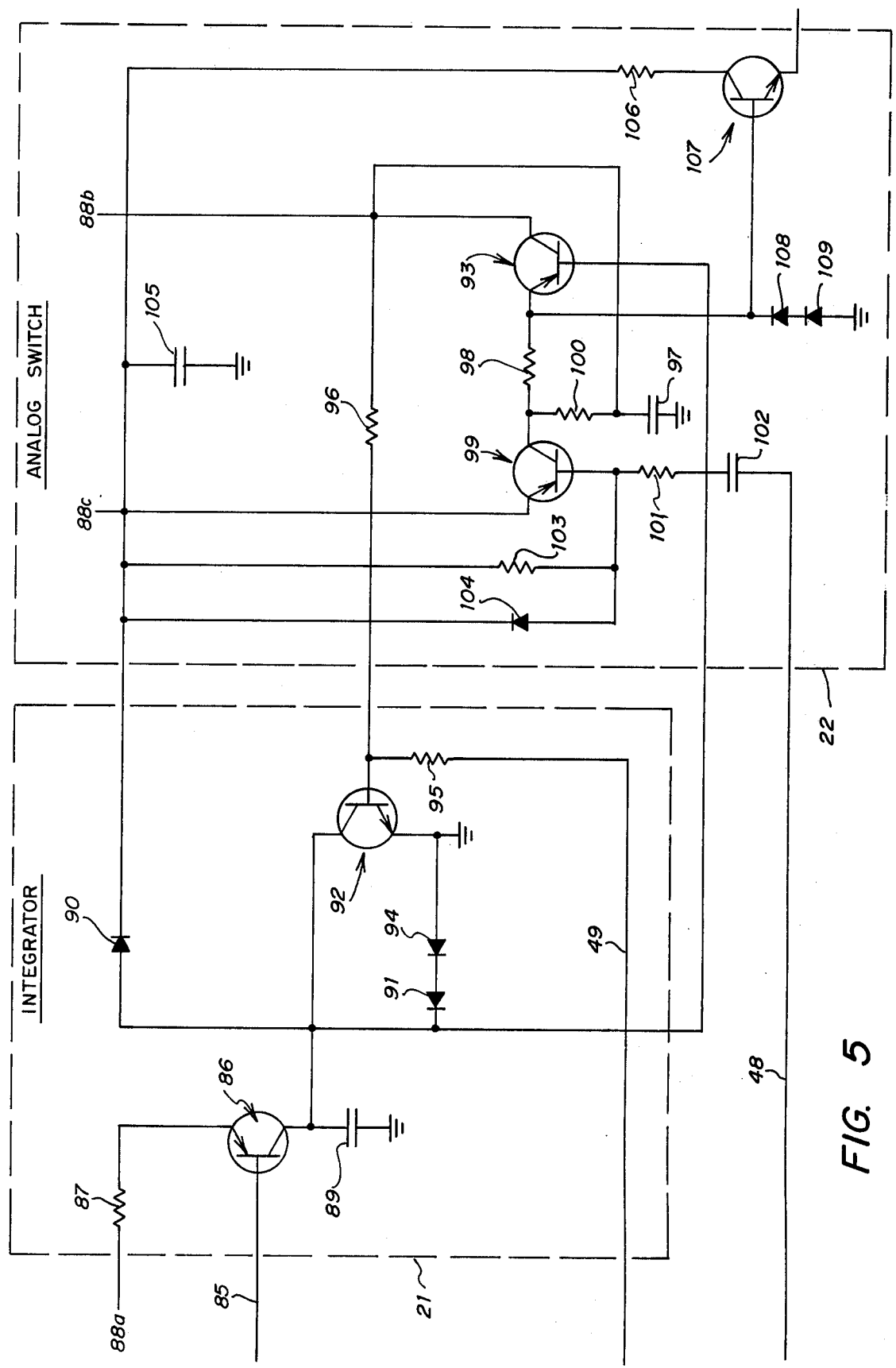
FIG. 5 is an electrical schematic diagram of an integrator and an analog switch comprising the system of FIG. 3.

FIG. 5 illustrates in electrical schematic diagram form integrator 21 and analog switch 22 of FIG. 3.

A video signal is received by way of a data line 85 leading to the base of a PNP transistor 86, the emitter of which is connected through a 330 ohm resistor 87 to a +12 volt source 88a. The collector of transistor 86 is connected to one terminal of a 330 picofarad capacitor 89 having a second terminal connected to ground. The collector of transistor 86 also is connected to the anode of a diode 90, to the cathode of a diode 91, to the collector of an NPN transistor 92, and to the base of a PNP transistor 93.

The emitter of transistor 92 is connected to the anode of a diode 94 and to ground. The cathode of diode 94 is connected to the anode of diode 91. The base of transistor 92 is connected through a 470 ohm resistor 95 to control line 49, and through a 4.7 K-ohm resistor 96 to the collector of transistor 93. Transistors 86 and 92, capacitor 89, resistors 87 and 95, and diodes 90, 91 and 94 comprise integrator 21 of FIG. 3.

The collector of transistor 93 also is connected to a −12 volt source 88b and to a first terminal of a 0.01 microfarad capacitor 97 having a second terminal connected to ground. The emitter of transistor 93 is connected through a 2.0 K-ohm resistor 98 to the collector of a PNP transistor 99, and through resistor 98 and a 1.0 K ohm resistor 100 to the first terminal of capacitor 97.

The base of transistor 99 is connected through a 220 ohm resistor 101 and a 470 picofarad capacitor 102 to line 48 leading to an output of clock control logic unit 37 of FIG. 3. The base of transistor 99 also is connected through a 10 K-ohm resistor 103 to the cathode of diode 90 and to a +5 volt source 88c. The base of transistor 99 further is connected to the anode of a diode 104, the cathode of which is connected to voltage source 88c. The emitter of transistor 99 is connected to voltage source 88c, and a first terminal of a 0.01 microfarad capacitor 105 having a second terminal connected to ground, and through a 51 ohm resistor 106 to the collector of an NPN transistor 107.

The base of transistor 107 is connected to the cathode of a diode 108 and to the emitter of transistor 93. The anode of diode 108 is connected to the cathode of a diode 109, the anode of which is connected to ground. The emitter of transistor 107 is connected to the positive input of comparator 24 of FIG. 3 and through capacitor 23 to ground.

Transistors 93, 99 and 107, capacitors 97, 102 and 105, resistors 96, 98, 100, 101, 103 and 106, and diodes 104, 108 and 109 comprise analog switch 22 of FIG. 3. Transistor 107 is a transistor especially suitable for analog switch embodiments, and is of a type such as Model No. MPS-H34 manufactured and sold by Motorola Semiconductor Products, Incorporated, of Phoenix, Ariz.

In operation, a video signal received from amplifier 20 on line 85 is converted to a current by transistor 86. The current charges capacitor 89 to effect an integration of the input video signal.

Near the end of an integration period, an enable signal occurs on line 48 to activate transistor 99 and transistor 93 of analog switch 22. The voltage on capacitor 89 then is transferred through transistors 93 and 107 to capacitor 23 of FIG. 3. After the voltage of capacitor 89 is transferred to capacitor 23, the transistor 99 is turned off to deactivate analog switch 22, and a reset signal occurs on line 49 to activate transistor 92 and discharge capacitor 89.

FIGURE 6

Figure 6:
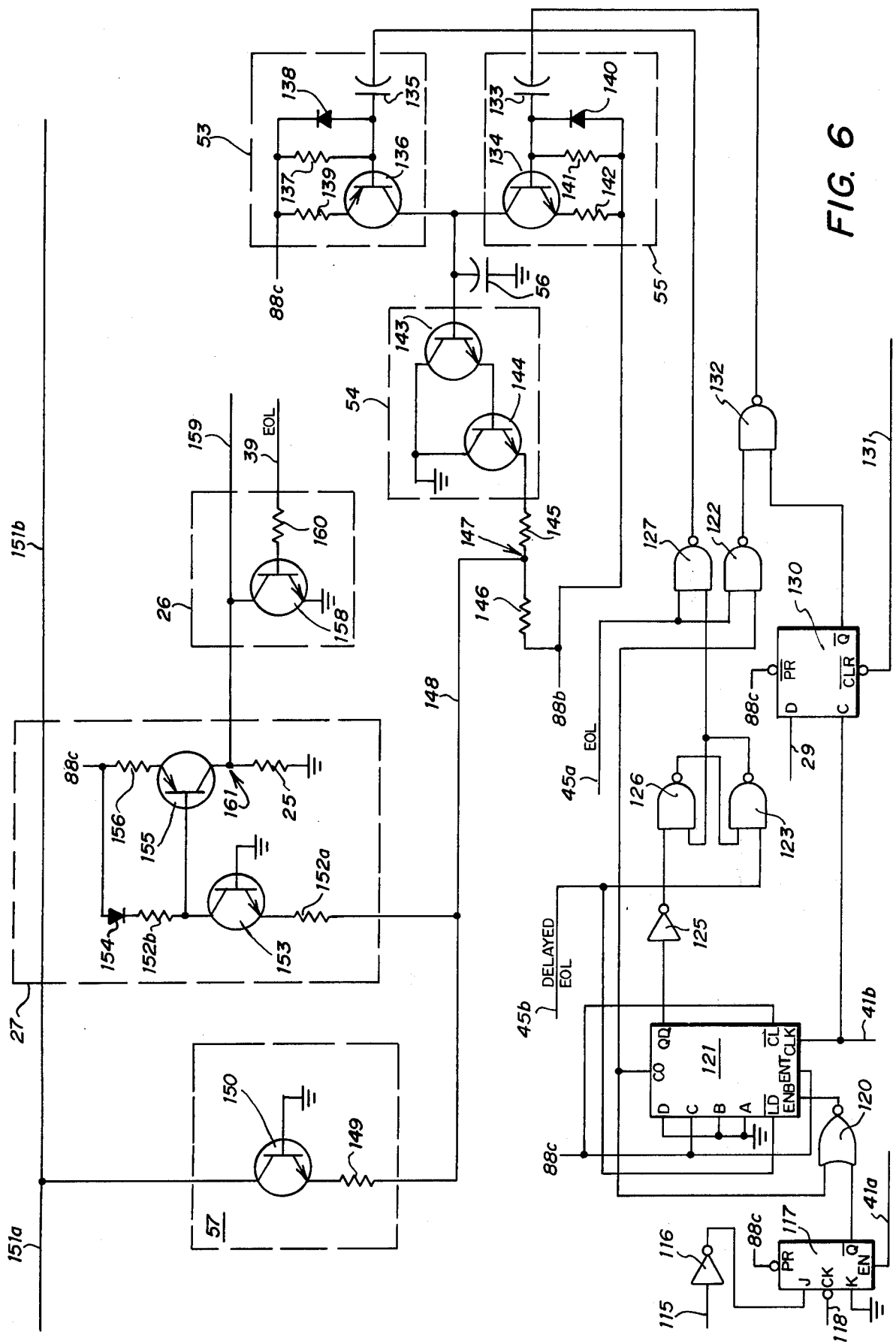
FIG. 6 is an electrical schematic diagram of an AGC control system comprising the system of FIG. 3.

FIG. 6 is an electrical schematic diagram of the AGC control system of FIG. 3.

The count fifteen pulses generated by NAND gate 34 are received by way of a control line 115 and an inverter 116 at the J input of a J-K flip-flop 117. The clock (CK) input to flip-flop 117 is connected to a control line 118 leading to the output of gate 28 of FIG. 3, and the K input is connected to ground. The enable input to the flip-flop is connected by way of control line 41 to logic unit 37 of FIG. 3, which supplies a phase three 1.8 MHz clock signal as illustrated by waveform 74 of FIG. 4a. The preset (PR) input to flip-flop 117 is connected to +5 volt source 33c, and the $\overline{Q}$ output of the flip-flop is connected to one input of a NOR gate 120. The output of gate 120 is connected to the enable B (ENB) input of a four bit counter 121. A second input to gate 120 is connected to the carry out (CO) output of counter 121 and to one input of a NAND gate 122.

The enable T input (ENT) of counter 121 is connected to the C input of the counter, to the complementary clear input ($\overline{CL}$) of the counter, and to +5 volt source 88c. The complementary load input ($\overline{LD}$) to counter 121 is connected to a first input of a NAND gate 123, and the D, B and A inputs of the counter are each connected to ground to load the counter with a count of four. The clock (CK) input to the counter is supplied by a phase eight 1.8 MHz clock signal generated by logic unit 37 on a control line 41b. The QD output of counter 121 is applied through an inverter 125 to one input of a NAND gate 126, a second input of which is connected to the output of gate 123 and to one input of a NAND gate 127.

The output of gate 126 is connected to a second input of gate 123. A second input to gate 122 is connected to a second input of gate 127, and to a control line 45a on which an end of line (EOL) synchronization pulse is applied by logic unit 37 of FIG. 3 at the end of a row scan. After a suitable delay, logic unit 37 also applies the EOL pulse to a control line 45b connected to the first input of gate 123 and to the complementary load input of counter 121.

The output of comparator 24, FIG. 3, is applied along line 29 to the D input of a D-type flip-flop 130, the complementary preset input of which is connected to the +5 volt source 88c. A 16.56 MHz clock signal is supplied by logic unit 37 to a control line 131 leading to the complementary clear input of flip-flop 130. The C input of the flip-flop is connected to line 41b, and the $\overline{Q}$ output of the flip-flop is connected to one input of a NAND gate 132. A second input to gate 132 is connected to the output of gate 122, and the output of gate 132 is connected through a 0.01 microfarad capacitor 133 to the base of an NPN transistor 134.

The output of NAND gate 127 is connected through a 0.01 microfarad capacitor 135 to the base of a PNP transistor 136. The base of transistor 136 also is connected through a 10 K-ohm resistor 137 to the cathode of a diode 138, and through resistor 137 to +5 volt source 88c. The cathode of diode 94 in addition is connected through a 470 ohm resistor 139 to the emitter of transistor 136, and the anode of the diode is connected to the base of transistor 136. Capacitor 135, transistor 136, diode 138, and resistors 137 and 139 comprise current source 53 of FIG. 3.

The base of transistor 134 further is connected to the cathode of a diode 140, through a 10 K-ohm resistor 141 to the anode of diode 140, and through resistor 141 to −12 volt source 88b. The emitter of transistor 134 is connected through a 470 ohm resistor 142 to voltage source 88b. Capacitor 133, transistor 134, diode 140, and resistors 141 and 142 comprise current sink 55 of FIG. 3.

The collectors of transistors 134 and 136 are each connected to one terminal of 0.33 microfarad capacitor 56, and to the base of an NPN transistor 143. A second terminal of capacitor 56 is connected to ground. The emitter of transistor 143 is connected to the base of an NPN transistor 144, and the collectors of transistors 143 and 144 are each connected to ground. The emitter of transistor 144 is connected through an 180 ohm resistor 145 and a 2.2 K-ohm resistor 146 to voltage source 88b. Transistors 143 and 144 comprise buffer amplifier 54 of FIG. 3.

A node 147 intermediate to resistors 145 and 146 is connected to a control line 148 leading through a 3.90 K-ohm resistor 149 to the emitter of an NPN transistor 150. The base of transistor 150 is connected to ground. The collector of the transistor is connected by way of a control line 151a to the output of switch 22 of FIG. 3, and by way of a control line 151b to the positive input of comparator 24. Resistor 149 and transistor 150 comprise current sink 57 of FIG. 3.

Line 148 also is connected through a 3.90 K-ohm resistor 152 to the emitter of an NPN transistor 153, the base of which is connected to ground. The collector of transistor 153 is connected through a 2.0 K-ohm resistor 152b to the cathode of a diode 154, and to the base of a PNP transistor 155.

The emitter of transistor 155 is connected through a 1.0 K-ohm resistor 156 to the anode of diode 154 and to voltage source 88c. The collector of transistor 155 is connected through resistor 25 to ground, and to the collector of an NPN transistor 158.

The collector of transistor 158 also is connected by way of a control line 159 to the negative input of comparator 24, and the emitter of the transistor is connected to ground. The base of transistor 158 is connected through a 220 ohm resistor 160 to line 39 leading to an output of logic unit 37 of FIG. 3.

Transistors 153 and 155, diode 154, and resistors 152 and 156 comprise current source 27 of FIG. 3. Transistor 158 and resistor 160 comprise analog switch 26 of FIG. 3.

In operation, a positive going EOL pulse is applied by way of line 45b to gate 123 and to the $\overline{LD}$ input of counter 121 a delayed time after the completion of a row scan. The counter thereupon is initialized with a count of four, and the QD and CO outputs of the counter transition to a logic zero. A gated 36 MHz signal is applied from gate 28 of FIG. 3 to line 118. If a count of 15 occurs at the output of counter 33 of FIG. 3 during a cell scan period, the output of NAND gate 34 transitions to a logic zero level to enable flip-flop 117 by way of inverter 116. Any subsequent clock pulses gated through NAND gate 28 during the cell scan period are received at the clock input of flip-flop 117, and cause the $\overline{Q}$ output of the flip-flop to transition to a logic zero level to identify a 16 count. Counter 121 counts the number of such 16 counts which occur during the scanning of each row of photosensor cells of an area array. If the number of such counts is greater than 10, the CO output of counter 121 transitions to a logic one level to disable gate 120. A counter roll over from a count of 15 to a count of zero thereby is prevented.

If the number of sixteen counts is less than 4 during a row scan, the CO and QD outputs of counter 121 remain in a logic zero state. The output of gate 123, therefore, remains in a logic one state. As the line 45a is normally at a logic zero level except for the occurrence of an EOL pulse at the completion of a row scan, the output of gate 127 remains at a logic one state during the row scan. Upon completion of the row scan, however, a negative going pulse appears at the output of gate 127 in response to an EOL pulse to command an increase in AGC gain.

Upon the occurrence of 4 sixteen counts during a row scan, the QD output of counter 121 transitions to a logic one and the output of gate 123 transitions to a logic zero to disable gate 127. Gate 122 remains in a logic one state so long as the CO output of counter 121 is at a logic zero state. Since the $\overline{Q}$ output of flip-flop 130 is normally at a logic one state, gate 132 remains disabled until either the $\overline{Q}$ output of the flip-flop or the output of gate 122 transitions to a logic zero. Thus, if between 4 and 10 sixteen counts occur during a row scan period, the logic states of gates 127 and 132 remain unchanged, and neither an increase nor a decrease in AGC gain may occur.

Upon the occurrence of more than 10 sixteen counts during a row scan period, however, the CO output of counter 121 transitions to a logic one to enable gate 122 and disable gate 120 as before described. Upon the occurrence of an EOL pulse on line 45a at the end of a row scan, the output of gate 122 transitions to a logic zero and a positive going pulse appears at the output of gate 132 to command a decrease in AGC gain. Such command occurs at the end of a row scan and during the transition period between row scans.

Flip-flop 117, counter 121 and gates 120, 122, 123, 126, 127 and 132 operate to differentiate between background levels and a character presence. For example, the occurrence of less than four 16 counts in a row scan period indicates that a black background has been viewed. The occurrence of more than 3 and less than 11 16 counts, however, is an indication of a character presence. A white background causes more than 10 16 counts to be accrued.

Flip-flop 130 and gate 132 provide an immediate gain adjustment when an image pattern changes from a black or high gain condition to a white or low gain condition.

By way of contrast, such gain adjustment may occur during a row scan rather than at the end of a row scan. More particularly, the output of comparator 24 is received at the D input of flip-flop 130, and the phase eight 1.8 MHz signal is received at the C input of the flip-flop. If a pulse generated by comparator 24 is of a width corresponding to a count of at least eighteen by the counter 33 of FIG. 3, then a positive edge of the 1.8 MHz phase 8 signal appearing at the C input of the flip-flop will occur during the time that the output of comparator 24 is high. When this coincidence occurs, the $\overline{Q}$ output of flip-flop 130 transitions to a logic zero to cause the output of NAND gate 132 to transition to a logic one, thereby commanding a decrease in AGC gain.

Transistors 134 and 136 are operated in the constant current mode to provide a linear charging and discharging of capacitor 56 upon the receipt of pulses from NAND gates 132 and 127, respectively. When a negative going pulse appears at the output of gate 127, transistor 136 conducts to charge capacitor 56. When a positive going pulse appears at the output of gate 132, transistor 134 conducts to discharge capacitor 56. The charge on capacitor 56 in turn is buffered by a Darlington pair comprising transistors 143 and 144 to control the current flowing on line 148. Transistors 143 and 144 form buffer amplifier 54 of FIG. 3.

Near the end of an integration period, switch 22 of FIG. 3 is enabled, and an integration voltage is transferred to capacitor 23. When switch 22 is disabled, capacitor 23 discharges at a rate controlled by the voltage at node 147. As the output of buffer amplifier 54 becomes more negative, the discharge current through transistor 150 increases to increase the discharge rate of capacitor 23. Conversely, the discharge current through transistor 150 decreases to decrease the discharge rate of capacitor 23 when the output of amplifier 54 becomes less negative.

The output of amplifier 54 indicates the type of background viewed in the information field, and the gain of the A/D converter comprising comparator 24, gates 28 and 34, and counter 33. If an increase in background white is sensed, the output of amplifier 54 becomes more negative and the current through transistor 153 increases. Transistors 153 and 155 are connected so that twice the current flowing through transistor 153 flows between the emitter and collector of transistor 155. As a consequence, a node 161 intermediate to resistor 25 and the collector of transistor 155 is raised to a positive voltage level with respect to ground. Such voltage level is approximately 20% of the background level sampled by switch 22 of FIG. 3.

As before described, the voltage level at node 161 serves to compress the operational range of comparator 24 between a black character reference level and a white paper background voltage level.

At the end of a frame scan period, a pulse issues from logic unit 37 of FIG. 3 on line 39 to ground node 161. During the period that node 161 is held at ground potential, the black reference voltage level is updated.

FIG. 7

Figure 7:
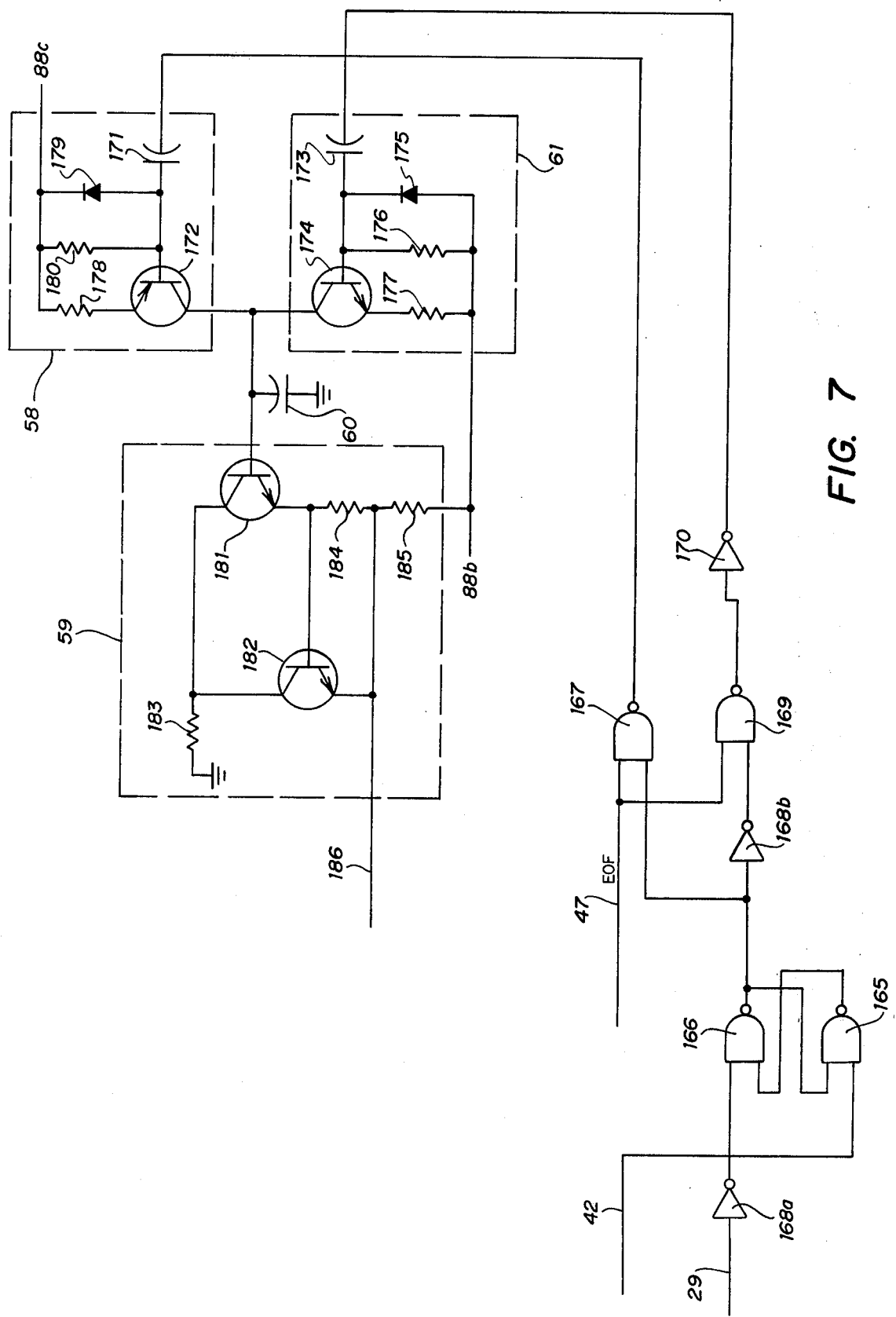
FIG. 7 is an electrical schematic diagram of a black reference control system comprising the system of FIG. 3.

FIG. 7 illustrates in electrical schematic diagram form the black reference control system of FIG. 3.

A phase nine 1.8 MHz clock signal is applied by way of control line 42 to one input of a NAND gate 165, a second input of which is connected to the output of a NAND gate 166. The output of NAND gate 165 is connected to a first input of gate 166.

The output of comparator 24 of FIG. 3 is applied by way of data line 29 through an inverter to a second input of NAND gate 166. The output of NAND gate 166 also is connected to one input of a NAND gate 167, and applied through an inverter 168b to one input of a NAND gate 169. A second input of gate 169 is connected to a third input of gate 167 and to line 47 leading from an output of logic unit 37 of FIG. 3. The output of NAND gate 169 is connected to the input of an inverter 170.

The output of NAND gate 167 is applied through a 0.01 microfarad capacitor 171 to the base of a PNP transistor 172. The output of inverter 170 is applied through a 0.01 microfarad capacitor 173 to the base of an NPN transistor 174. The base of transistor 174 also is connected to the cathode of a diode 175, and through a 10 K-ohm resistor 176 to the anode of diode 175 and to the −12 volt source 88b. The emitter of transistor 174 is connected through a 2.7 K-ohm resistor 177 to voltage source 88b. The collector of transistor 174 is connected to the collector of transistor 172, and to a first terminal of capacitor 60 having a second terminal connected to ground. Capacitor 173, transistor 174, diode 175, and resistors 176 and 177 comprise current sink 61 of FIG. 3.

The emitter of transistor 172 is connected through a 2.7 K-ohm resistor 178 to the cathode of a diode 179, and through resistor 178 to +5 volt source 88c. The cathode of diode 179 also is connected through a 10 k-ohm resistor 180 to the anode of the diode and to the base of transistor 172. Capacitor 171, transistor 172, diode 179, and resistors 178 and 180 comprise current source 58 of FIG. 3.

The collectors of transistors 172 and 174 further are connected to the base of an NPN transistor 181, the emitter of which is connected to the base of an NPN transistor 182. The collector of transistor 181 is connected to the collector of transistor 182, and through a 330 ohm resistor 183 to ground. The base of transistor 182 also is connected through a 10 K-ohm resistor 184 to the emitter of the transistor, and through resistor 184 and a 1.0 k-ohm resistor 185 to voltage source 88b. The emitter of transistor 182 further is connected to a node intermediate to resistors 184 and 185, and to a control line 186 leading to the positive input of differential amplifier 20 of FIG. 3. Transistors 181 and 182 with their associated networks comprise amplifier 59 of FIG. 3.

The black reference control system adjusts the operating point of amplifier 20 of FIG. 3 to null out DC offset voltages which may appear during an immediate rescanning of the last two rows of a sensor array. Upon initiation of a black row rescan, logic unit 37 of FIG. 3 disables current source 27 through switch 26, and issues an end of frame (EOF) pulse comprising two groups of twelve pulses along line 47 to gates 167 and 169. Thus, during the two black row rescans of the bottom row of sensor cells, comparator 24 of FIG. 3 compares the black pattern response with the grounded reference signal at its negative input. If the black pattern voltage is above ground, the output of the comparator will be a logic one. If the black pattern voltage is below ground level, however, the output of the comparator 24 will be at a logic zero level.

The output of comparator 24 is applied by way of data line 29 to gate 166. In addition, a phase nine 1.8 MHz signal on line 42 is applied to gate 165. Upon the occurrence of a logic one at the output of comparator 24, the output of gate 166 transitions to a logic one to disable gate 169. Further, the output of gate 167 transitions to a logic zero for one cell scan period to form a negative going pulse, thereby activating transistor 172 to charge capacitor 60.

If the output of comparator 24 transitions to a logic one, the output of gate 166 transitions to a logic zero to disable gate 167. Gate 169, however, is enabled to form a positive going pulse with a pulse width of one cell scan period at the output of gate 170. Transistor 174 is activated thereby to discharge capacitor 60.

Transistors 172 and 174 establish an operating voltage level across capacitor 60 by adding or removing a charge from the capacitor. The voltage across capacitor 60 is buffered by a Darlington pair comprising transistors 181 and 182, and applied to the positive input of amplifier 20 of FIG. 3 by way of line 186. The black reference voltage level across capacitor 60 thereby establishes a quiescent operating level for amplifier 20 and integrator 21.

FIG. 8

Figure 8:
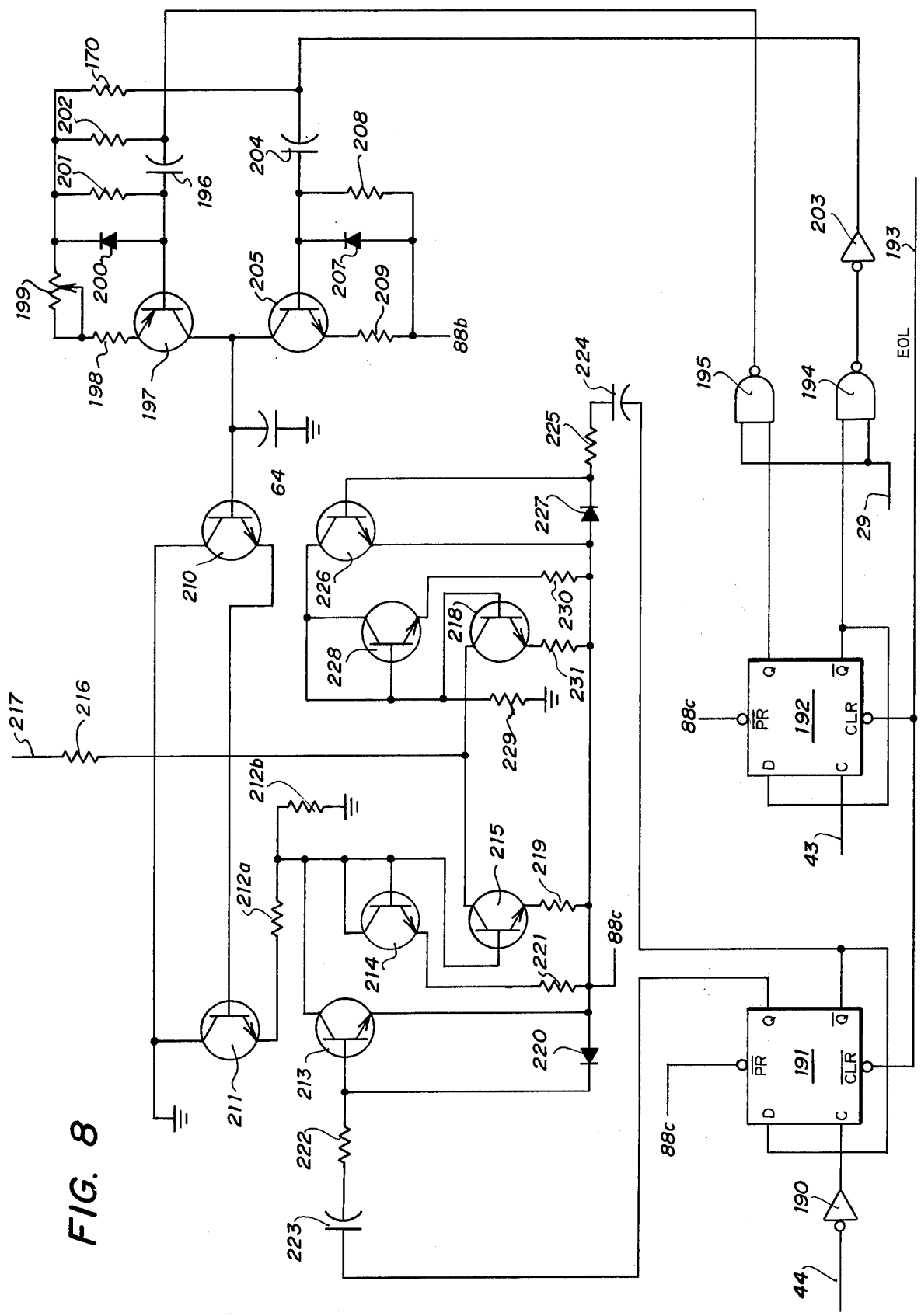
FIG. 8 is an electrical schematic diagram of a fixed pattern odd/even noise control system comprising the system of FIG. 3.

FIG. 8 illustrates in electrical schematic diagram form the odd/even control system of FIG. 3.

A Phase four 1.8 MHz clock signal from logic unit 37 of FIG. 3 is applied along line 44 and through an inverter 190 to the C input of a D-type flip-flop 191. The complementary preset input of the flip-flop is connected to +5 volt source 88c. The D input of the flip-flop is connected to the $\overline{Q}$ output, the complementary clear input is connected to the complementary clear input of a D-type flip-flop 192 and to a control line 193 leading to a 130 KHz signal derived from the 36 MHz system clock.

The D input to flip-flop 192 is connected to the $\overline{Q}$ output of the flip-flop, and to one input of a NAND gate 194. The C input to flip-flop 192 is connected by way of line 43 to the phase zero 1.8 MHz output of logic unit 37 of FIG. 3. The complementary preset input of flip-flop 192 is connected to voltage source 88c, and the Q output of the flip-flop is connected to one input of a NAND gate 195.

A second input of gate 194 is connected to a second input of gate 195, and to the output of comparator 24 of FIG. 3 by way of data line 29. The output of NAND gate 195 is applied through a 0.01 microfared capacitor 196 to the base of a PNP transistor 197. The emitter of transistor 197 is connected through a 1.2 K-ohm resistor 198 and a 500 ohm resistor 199 to the cathode of a diode 200. The emitter of transistor 197 also is connected through resistor 198 to the arm of a potentiometer having as its resistance the resistor 199.

The anode of diode 200 is connected to the base of transistor 197. The cathode of diode 200 further is connected through a 10 K-ohm resistor 201 to the base of transistor 197, and through a 1.0 K-ohm resistor 202 to the output of NAND gate 195.

The output of NAND gate 194 is applied through an inverter 203 and a 0.01 microfarad capacitor 204 to the base of an NPN transistor 205. The output of inverter 203 also is applied through a 1.0 K-ohm resistor 206 to the cathode of diode 200. The base of transistor 205 in addition is connected to the cathode of a diode 207 and through a 10 K-ohm resistor 208 to the anode of the diode. The emitter of transistor 205 is connected through a 1.30 K-ohm resistor 209 to the anode of diode 207 and to the −12 volt source 88b. The collectors of transistors 197 and 205 each are connected to the base of a PNP transistor 210, and to one terminal of capacitor 64 having a second terminal connected to ground.

The collector of transistor 210 is connected to the collector of an NPN transistor 211 and to ground, and the emitter of transistor 210 is connected to the base of transistor 211. The emitter of transistor 211 is connected through a 2.7 K-ohm resistor 212a to the collector of an NPN transistor 213, and through resistor 212a to the collector of an NPN transistor 214. The collectors of transistors 213 and 214 are each connected to the base of transistor 214, and through a 1.4 K-ohm resistor 212b to ground. The base of transistor 214 also is connected to the base of an NPN transistor 215, the collector of which is connected through a 470 ohm resistor 216 to a control line 217 leading to integrator 21 of FIG. 3.

The collector of transistor 215 also is connected to the collector of an NPN transistor 218. The emitter of transistor 215 is connected through a 100 ohm resistor 219 to the anode of a diode 220, and through resistor 219 and a 100 ohm resistor 221 to the emitter of transistor 214. The anode of diode 220 in addition is connected to the -12 volt source 88b, and the cathode of the diode is connected to the base of transistor 213. The base of transistor 213 further is connected through a 330 ohm resistor 222 and a 200 picofarad capacitor 223 to the Q output of flip-flop 191.

The $\overline{Q}$ output of flip-flop 191 also is connected through a 200 picofarad capacitor 224 and a 330 ohm resistor 225 to the base of an NPN transistor 226. The base of transistor 226 in addition is connected to the cathode of a diode 227, and the emitter of the transistor is connected to the anode of diode 227. The collector of transistor 226 is connected to the collector and base of an NPN transistor 228, to the base of transistor 218, and through a 1.10 K-ohm resistor 229 to ground.

The emitter of transistor 228 is connected through a 100 ohm resistor 230 to the anode of diode 227. The emitter of transistor 218 is connected through a 100 ohm resistor 231 to the anode of diode 227 and to the anode of diode 220.

Prior to operation, the potentiometer comprising resistor 199 in the emitter circuit of transistor 197 is adjusted to balance the responses of transistors 197 and 205 to pulses having equal pulse widths. In operation, a phase zero 1.8 MHz clock signal is applied to the C input of flip-flop 192, the Q output of which is normally at a logic one level. As the logic level of line 43 shifts between logic zeros and logic one, the Q and $\overline{Q}$ outputs of the flip-flop alternately enable gates 194 and 195. At the end of a row scan, an EOL (end of line) signal is applied by way of line 193 to synchronize the operation of flip-flops 191 and 192 with the scanning of the photosensor array. Thus, when an initial cell of a row of sensor cells is addressed, the Q outputs of flip-flops 191 and 192 are at a logic one level and the $\overline{Q}$ outputs of the flip-flops are at a logic zero level.

The output of comparator 24 of FIG. 3 is applied to gates 194 and 195 by way of line 29. As flip-flop 192 alternately enables gates 194 and 195, the odd cell signals occurring at the output of comparator 24 appear at the output of gate 194 and the even cell signals appear at the output of gate 195 to activate transistors 205 and 197, respectively. More particularly, when a negative going pulse appears at the output of gate 195, transistor 197 is activated to charge capacitor 64. Upon the occurrence of a positive going pulse at the output of inverter 203, transistor 205 is activated to discharge capacitor 64. The cumulative effect is to stabilize the voltage across capacitor 64 when the average difference between the heights of the odd and even sensor cell responses is zero over multiple frame periods. More particularly, the current to capacitance quotient associated with capacitor 64 is small. Thus, only small incremental changes of the order of a few millivolts may be made to the voltage across capacitor 64 during a cell scan period. Large transients, therefore, are essentially ignored unless reflected by fixed odd/even cell pulse-width differences existing over several frame scan periods.

The voltage across capacitor 64 is applied through a Darlington pair comprised of transistors 210 and 211, and applied to resistors 212a and 212b. Resistors 212a and 212b control the magnitude of the current applied to the collectors of transistors 213 and 214.

A phase four 1.8 MHz signal is applied through inverter 190 to the C input of flip-flop 191, the Q output of which is normally at a logic one level. As the output of inverter 190 shifts between logic zero and logic one levels, the Q and $\overline{Q}$ outputs of the flip-flop alternately activate transistors 213 and 226, respectively. As before described, an EOL pulse occurs on line 193 at the end of a row scan to synchronize the operation of flip-flops 191 and 192 with the scanning of the photosensor array.

Transistor 213 is activated during odd cell scans to bypass the emitter current of transistor 211 to voltage source 88c. Concurrently, transistor 226 is in a nonconducting state. Current thus flows from resistor 229, through the collector to the emitter of transistor 228, and to the voltage source 88c. Such current flow causes the transistor 218 to conduct with the result that the current flowing through resistors 216 and 231 corresponds in magnitude to that flowing through resistor 230. The current on line 217 under these conditions sets a fixed offset to be applied by integrator 21 during odd sensor cell processing.

During even cell scans, transistor 213 is in a nonconducting state and transistor 226 is in a conducting state. Transistors 218 and 228 are deactivated thereby, and current flows from ground through resistor 213b, thence from the collector to the emitter of transistor 214, and through resistor 221 to source 88c. The current flowing through transistor 214 also is applied to the base of transistor 215. Transistor 215 is activated with the result that the current flowing in line 217 corresponds to that flowing through resistor 221. Such current sets the offset correction to be applied by integrator 21 during even sensor cell processing.

It is to be recognized that during odd cell scans, a voltage modulation across capacitor 64 does not induce a corresponding modulation of the current flowing through line 217. During even cell scans when transistor 213 is in a nonconducting state, however, a voltage modulation across capacitor 64 causes a change in the current flowing through resistor 212a. The current change in turn induces a modulation into the current flowing through data line 217.

A primary effect of the odd/even control system disclosed herein is to equalize at the cell scan rate the height of the even and odd cell responses, and thus eliminate the effect of fixed pattern odd/even noise. In addition, the odd/even control system, when combined with an AGC control system updated at the row scan rate and a black reference control system updated at the frame scan rate as disclosed herein, provides an environment for a more accurate background tracking by the AGC control system. A more stable and accurate black pattern reference for sensor cell black/white decision processing also is provided.

In accordance with the invention, a dynamic odd/even noise correcting method and system is provided for substantially eliminating fixed pattern odd/even noise in the output video signal of a photosensor array. The system senses a pulse width modulated video signal, and adjusts the widths of alternate pulses in the pulse stream to effect a uniform average response from adjacent photosensor cells when an information pattern moves across the array. In a specific embodiment, the odd/even noise correcting system coacts with an AGC control system updated at the row scan rate, and with a black reference control system updated at the frame scan rate, to not only substantially eliminate fixed pattern odd/even noise and effectively suppress cell clock noise in the output video signal, but also reduce the effects of system sensitivity to variations in the array parasitic capacitance more efficiently than with prior systems.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In a video signal conditioning system for a self-scanning array of photosensor cells including a pulse width modulating means, the combination which comprises:
    a. charge accumulation means responsive to video pulses issuing from said pulse width modulating means for storing incremental charges to form a charge sum reflecting the average of differences between responses of adjacent photosensor cells of said array; and
    b. pulse width correction means in electrical communication with said charge accumulation means for applying said charge sum to said pulse width modulating means to alter the pulse width of alternate ones of said video pulses.

2. The combination set forth in claim 1, wherein said charge accumulation means includes:
    a. means for separating said video pulses into an odd cell pulse train and an even cell pulse train;
    b. charge storing means for accumulating incremental charges at the photosensor cell scan rate;
    c. current source means in electrical communication with said charge storing means and responsive to said even cell pulse train for incrementally charging said charge storing means at a rate dependent upon the pulse widths of said even cell pulse train; and
    d. current sink means in electrical communication with said charge storage means and responsive to said odd cell pulse train for incrementally discharging said charge storing means at a rate dependent upon the pulse widths of said odd cell pulse train.

3. A dynamic noise correction system for eliminating fixed pattern odd/even noise in an output video signal of an array of photosensor cells, which comprises:
    a. pulse width modulating means operating upon said output video signal for forming a pulse train, wherein each pulse has a width corresponding to the response of one of said photosensor cells;
    b. offset generation means responsive to said pulse train for generating at the cell scan rate an offset voltage indicative of the average difference between video responses of adjacent photosensor cells; and
    c. pulse width correction means responsive to said offset voltage for modifying the pulse widths of alternate pulses of said pulse train.

4. The combination set forth in claim 3, wherein said offset generation means includes:
    a. means for separating said pulse train into an even cell pulse train and an odd cell pulse train;
    b. charge storing means for providing said offset voltage;
    c. means responsive to said even cell pulse train for incrementally charging said charge storing means at the cell scan rate; and
    d. means responsive to said odd cell pulse train for incrementally discharging said charge storing means at the cell scan rate.

5. The combination set forth in claim 3, wherein said pulse width modulating means includes:
    a. an integrator;
    b. an analog switch in electrical communication with said integrator for sampling the output of said integrator near the end of a cell scan period;
    c. ramp generating means receiving an integration voltage from said analog switch for generating a voltage ramp, said voltage ramp having a height dependent upon the amplitude of said integration voltage and a slope element dependent upon the gain of said dynamic noise correction system;
    d. means for generating a reference voltage; and
    e. comparator means responsive to said voltage ramp and said reference voltage for forming a pulse having a width indicative of the grey level of an optical image presented to said array.

6. The combination set forth in Claim 5, wherein said pulse width correction means includes:
    a. means responsive to said offset voltage for modifying the output voltage of said integrator; and
    b. means for applying a fixed offset to the output voltage of said integrator.

7. A method of substantially reducing the effects of fixed pattern odd/even noise in a video signal generated by an array of photosensor cells, which comprises:
    a. integrating said video signal at the photosensor cell scan rate;
    b. sampling an integration voltage near the end of a photosensor cell scan period;
    c. converting a sampled integration voltage to a voltage ramp indicative of the magnitude of said sampled integration voltage and the grey level of said video signal;
    d. generating a black character threshold value;
    e. comparing said voltage ramp with the black character threshold value to form a pulse stream of alternating even and odd pulses respectively corresponding to video responses of even and odd photosensor cells;

f. accumulating incremental voltages to form an offset correction voltage in response to even pulses of said pulse stream;

g. eliminating incremental voltages from said offset correction voltage in response to odd pulses of said pulse stream; and h. applying said offset correction voltage to said integration voltage during even photosensor cell scan periods.

8. A dynamic noise correction system for an optical reader including a photosensor array, which comprises:
   a clock control logic circuit for supplying a plurality of clock and scan rate signals to said system;
   b. pulse width modulating means operating at a photosensor cell scan rate upon a video signal generated by said photosensor array:
   c. AGC control means updated at the row scan rate and in electrical communication with said pulse width modulation means for tracking the background of an information field within the field of view of said optical reader;
   d. black reference control means updated at the frame scan rate and in electrical communication with said pulse width modulating means for substantially eliminating DC offsets in said video signal; and
   e. odd/even noise control means responsive to said pulse width modulating means and operating at said photosensor cell scan rate for substantially eliminating fixed pattern odd/even noise in said video signal.

9. A dynamic noise correction system for substantially reducing the effects of fixed pattern odd/even noise in a video signal generated by an array of photosensor cells, which comprises:
   a. pulse width modulating means operating upon said video signal for forming a train of pulses at the cell scan rate, said train of pulses having pulse widths dependent upon the amplitude of the video response of a photosensor cell and the grey level of the optical image presented to said array;
   b. charge storage means for providing an offset correction voltage for said video signal;
   c. means responsive to alternate pulses of said train of pulses for adding incremental charges to said charge storage means at the cell scan rate;
   d. means responsive to pulses other than said alternate pulses in said train of pulses for incrementally discharging said charge storage means at the cell scan rate; and
   e. means responsive to said offset correction voltage for adjusting the pulse width of said alternate pulses.

10. A dynamic noise correction system for a self-scanning array of photosensor cells, which comprises:
    a. integrating means operating at a photosensor cell scan rate upon a video signal generated by said self-scanning array;
    b. sampling means connected to the output of said integrating means for transferring an integration voltage from said integrating means near the end of a photosensor cell scan period;
    c. charge storage means in electrical communication with said sampling means for forming a voltage ramp;
    d. comparator means responsive to said voltage ramp for forming a stream of pulses, the width of each pulse of said stream being dependent upon the magnitude of said integration voltage and the grey level indicated by a photosensor cell response;
    e. circuit means for generating a clock signal;
    f. gating means responsive to said stream of pulses for pulse modulating said clock signal;
    g. counting means in electrical communication with said gating means for counting the cycles of said clock signal in each pulse formed by said gating means;
    h. AGC control means responsive to said comparator means, said gating means and said counting means for controlling the discharge rate of said charge storage means and the operational range of said comparator means;
    i. black reference control means responsive to said comparator means for eliminating DC offsets occurring in said video signal; and
    j. odd/even noise control responsive to said comparator means for applying an amplitude correction to said integrating means during alternate photosensor cell scan periods to substantially eliminate fixed pattern odd/even noise in said video signal.

11. An odd/even noise control system for substantially eliminating fixed pattern odd/even noise in a video signal generated by a photosensor array, which comprises:
    a. a first D-type flip-flop having its Q output connected to its D input;
    b. first and second NAND gates, with one input of said first NAND gate being connected to the Q output of said first D-type flip-flop, and one input to said second NAND gate being connected to the Q output of said first D-type flip-flop, and second inputs to said first and said second NAND gates receiving a pulse width modulated video signal;
    c. a capacitor;
    d. current source means connected to the output of said first NAND gate and in electrical communication with said capacitor for charging said capacitor at a rate dependent upon the pulse width of pulses formed at the output of said first NAND gate;
    e. current sink means having an inverted input connected to the output of said second NAND gate, said current sink means further being in electrical communication with said capacitor for discharging said capacitor at a rate dependent upon the pulse widths of pulses formed at the output of said second NAND gate;
    f. a Darlington pair of transistors responsive to the voltage across said capacitor;
    g. first and second resistors in serial connection, said first resistor being further connected to the output of said Darlington pair and said second resistor further being connected to ground;
    h. a first NPN transistor having a collector connected to a node intermediate to said first and said second resistors;
    i. second and third NPN transistors having bases joined together and to the collector of said first NPN transistor and to the collector of said second NPN transistor, said second and said third NPN transistors further having emitters resistively connected to the emitter of said first NPN transistor;
    j. a first diode, the anode of which is connected to the emitter of said first NPN transistor, and the cathode of which is connected to the base of said first NPN transistor;

k. a fourth NPN transistor having a collector connected to the collector of said third NPN transistor, an emitter resistively connected to the anode of said first diode, and a base resistively connected to ground;

l. a fifth NPN transistor having a collector connected to its base and to the collector of said fourth NPN transistor, and further having an emitter resistively connected to the anode of said first diode;

m. a sixth NPN transistor having a collector connected to the collector of said fifth NPN transistor, and an emitter connected to the anode of said first diode;

n. a second diode having an anode connected to the emitter of said sixth NPN transistor, and a cathode connected to the base of said sixth NPN transistor; and o. a second D-type flip-flop, the Q output of which is capacitively and resistively connected to the base of said first NPN transistor, and the Q output of which is capacitively and resistively connected to the base of said sixth NPN transistor, said second D-type flip-flop further having its D input joined to its Q output.

12. The method of video signal conditioning where a self-scanning array of photosensor cells supplies a video signal to a pulse width modulator, which comprises:

a. accumulating as a charge sum charges generated in response to video pulses issuing from said modulator, said charge sum reflecting the average of differences between responses of adjacent photosensor cells of said array; and b. correcting pulse widths by applying said charge sum to said pulse width modulator to alter the pulse width of alternate ones of said video pulses.

13. The method of reducing fixed pattern odd/even noise in a video signal produced by scanning an area photocell array to produce a video signal which comprises:

a. integrating the output of each cell as it appears in said signal;

b. producing from the integration voltages a pulse stream comprising a set of even pulses interlaced with a set of odd pulses;

c. comparing the width of each even pulse in said stream with the width of an adjacent odd pulse to produce a control voltage dependent upon the difference therebetween; and d. in response to said control voltage, modifying the width of pulses in one of said sets.

* * * * *